(12) United States Patent
Erickson et al.

(10) Patent No.: US 10,889,057 B2
(45) Date of Patent: Jan. 12, 2021

(54) MATERIAL SETS

(71) Applicant: Hewlett-Packard Development Company, L.P., Houston, TX (US)

(72) Inventors: Kristopher J. Erickson, Palo Alto, CA (US); Howard S Tom, Palo Alto, CA (US); Lihua Zhao, Palo Alto, CA (US); Ali Emamjomeh, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 291 days.

(21) Appl. No.: 16/073,262

(22) PCT Filed: May 12, 2016

(86) PCT No.: PCT/US2016/031969
§ 371 (c)(1),
(2) Date: Jul. 26, 2018

(87) PCT Pub. No.: WO2017/196321
PCT Pub. Date: Nov. 16, 2017

(65) Prior Publication Data
US 2019/0030801 A1    Jan. 31, 2019

(51) Int. Cl.
| | | |
|---|---|---|
| *B29C 64/165* | (2017.01) | |
| *C08K 3/01* | (2018.01) | |
| *C08K 3/04* | (2006.01) | |
| *B33Y 30/00* | (2015.01) | |
| *B33Y 70/00* | (2020.01) | |

(Continued)

(52) U.S. Cl.
CPC .............. *B29C 64/165* (2017.08); *C08K 3/01* (2018.01); *C08K 3/04* (2013.01); *B29K 2105/005* (2013.01); *B29K 2105/0038* (2013.01); *B33Y 10/00* (2014.12); *B33Y 30/00* (2014.12); *B33Y 70/00* (2014.12)

(58) Field of Classification Search
None
See application file for complete search history.

(56) References Cited

U.S. PATENT DOCUMENTS

| | | |
|---|---|---|
| 5,803,958 A | 9/1998 | Katsen |
| 6,224,661 B1 | 5/2001 | Tregub et al. |

(Continued)

FOREIGN PATENT DOCUMENTS

| | | |
|---|---|---|
| CN | 1535202 | 10/2004 |
| CN | 104742369 | 7/2015 |

(Continued)

OTHER PUBLICATIONS

PVC's physical properties, http://www.seepvcforum.com/en/content/6-pvc-s-physical-properties (Year: 2010).*

(Continued)

*Primary Examiner* — Mary Lynn F Theisen
(74) *Attorney, Agent, or Firm* — Thorpe, North & Western LLP

(57) ABSTRACT

The present disclosure is drawn material sets, coalescent fluids, and 3-dimensional printing systems. An example material set can include an amorphous polymer powder having an average particle size from 1 micron to 300 microns, and a coalescent fluid including a viscosity reducing agent.

15 Claims, 4 Drawing Sheets

(51) Int. Cl.
*B33Y 10/00* (2015.01)
*B29K 105/00* (2006.01)

(56) References Cited

U.S. PATENT DOCUMENTS

| | | |
|---|---|---|
| 6,454,811 B1 | 9/2002 | Sherwood et al. |
| 9,045,657 B2 | 6/2015 | Lewis et al. |
| 9,050,820 B2 | 6/2015 | Soleimani |
| 2002/0195747 A1* | 12/2002 | Hull ............... B33Y 10/00 264/401 |
| 2004/0145088 A1 | 7/2004 | Patel et al. |
| 2005/0059757 A1 | 3/2005 | Bredt et al. |
| 2005/0087902 A1 | 4/2005 | Farr et al. |
| 2005/0218549 A1 | 10/2005 | Farr et al. |
| 2007/0007698 A1* | 1/2007 | Sano ............... B29C 64/165 264/496 |
| 2011/0156301 A1 | 6/2011 | Giller et al. |
| 2014/0113075 A1 | 4/2014 | Maillot et al. |
| 2015/0024169 A1 | 1/2015 | Martin |
| 2015/0259247 A1* | 9/2015 | Watanabe ......... C04B 12/025 264/642 |

FOREIGN PATENT DOCUMENTS

| | | |
|---|---|---|
| EP | 2001656 B1 | 10/2014 |
| GB | 2422344 | 7/2006 |
| JP | H09158094 A | 6/1997 |
| TW | 200538416 | 12/2005 |
| WO | WO-2007/020870 | 2/2007 |
| WO | WO-2015-167520 A1 | 11/2015 |
| WO | WO-2015167520 | 11/2015 |
| WO | WO-2016053248 A1 * | 4/2016 ........ C09D 11/10 |

OTHER PUBLICATIONS

Data Sheet—Butvar B-76.

* cited by examiner

MATERIAL SETS

BACKGROUND

Methods of 3-dimensional (3D) digital printing, a type of additive manufacturing, have continued to be developed over the last few decades. Various methods for 3D printing have been developed, including heat-assisted extrusion, selective laser sintering, photolithography, as well as others. In selective laser sintering, for example, a powder bed is exposed to point heat from a laser to melt the powder wherever the object is to be formed. This allows for manufacturing complex parts that can be difficult to manufacture using traditional methods. However, systems for 3D printing have historically been very expensive, though those expenses have been coming down to more affordable levels recently. In general, 3D printing technology improves the product development cycle by allowing rapid creation of prototype models for reviewing and testing. The concept has been somewhat limited with respect to commercial production capabilities because the range of materials used in 3D printing is likewise limited. Therefore, research continues in the field of new techniques and materials for 3D printing.

Figure 1A:
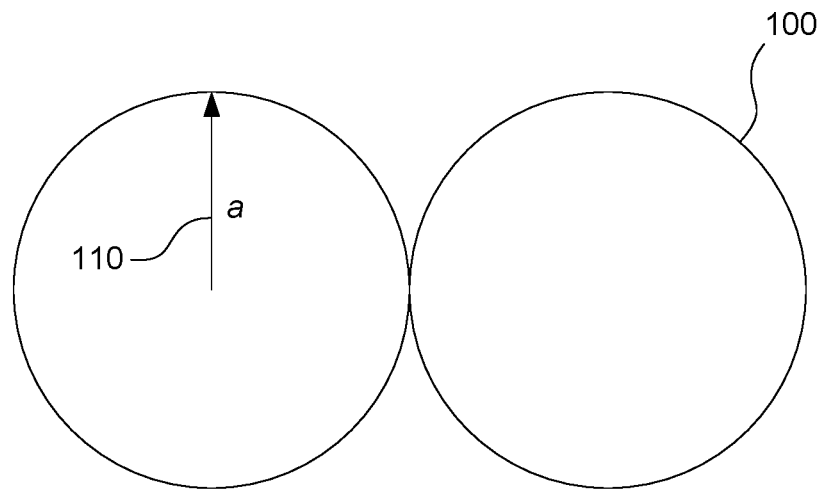
FIGS. 1A and 1B are schematic cross-sectional views of two coalescing particles of polymer powder in accordance with examples of the present disclosure.

The figures depict examples of the presently disclosed technology. However, it should be understood that the present technology is not limited to the examples depicted.

DETAILED DESCRIPTION

The present disclosure is drawn to the area of 3-dimensional printing. More specifically, the present disclosure provides material sets, systems, and fluids for 3-dimensional printing. In an exemplary printing process, a thin layer of thermoplastic polymer powder can be spread on a bed to form a powder bed. A printing head, such as a fluid jet print head, can then be used to print a thermal coalescent fluid over portions of the powder bed corresponding to a thin layer of the three dimensional object to be formed. Then the bed can be exposed to an electromagnetic radiation fusing source, e.g., typically the entire bed. The thermal coalescent fluid can absorb more energy from the fusing source than the unprinted powder. Absorbed fusing light energy can be converted to thermal energy, causing the printed portions of the powder to melt and coalesce. This can form a solid layer. After the first layer is formed, a new thin layer of polymer powder can be spread over the powder bed and the process can be repeated to form additional layers until a complete 3-dimensional part is printed. Such 3-dimensional printing processes can achieve fast throughput with good accuracy.

Such 3-dimensional printing process can often be used with semi-crystalline polymer powders. Examples of semi-crystalline polymers include polyamides such as nylon 6, nylon 11, nylon 12, and others. Such semi-crystalline polymer powders can be fused by heating a polymer powder above its characteristic melting point. In the process described above, this can be accomplished by printing a thermal coalescent fluid onto a portion of the powder and then exposing the powder to a light source. The printed portion of the powder can be heated above the characteristic melting point of the polymer, while surrounding powder remains below the characteristic melting point. Thus, semi-crystalline polymer powder can be used to form 3-dimensional printed parts with good selectivity between the fused and unfused portions of the powder bed.

However, a variety of non-crystalline, or amorphous polymers are also of interest in the field of 3-dimensional printing. Forming 3-dimensional printed parts from amorphous polymer powder can be challenging because amorphous polymers lack a characteristic melting point. Instead of melting and fusing at a specific temperature, amorphous polymers tend to soften gradually over a range of temperatures. Thus, when amorphous polymer powder is used in the 3-dimensional printing process described above, it can be difficult to form a fused portion of the powder bed without fusing or partially fusing neighboring polymer particles. As a result, 3-dimensional printed parts formed from amorphous polymer powder can tend to have poor selectivity, with a large amount of caking of the polymer powder around the printed parts. This problem can occur with other methods of 3-dimensional printing as well. For example, in selective laser sintering (SLS) methods, a laser may be used to fuse a portion of a powder bed, Thermal bleed from the fused particles to neighboring particles can cause neighboring particles also to fuse or partially fuse, resulting in a part of poor quality.

Because amorphous polymers do not experience a specific melting event when their temperature is raised, the softening of amorphous polymers can instead be viewed conceptually as a reduction in viscosity of the polymer with increasing temperature. In their solid form, amorphous polymers can have a high viscosity. With increasing temperature, the amorphous polymers can experience a gradual reduction in viscosity until the amorphous polymer is flowable. Semi-crystalline polymers also experience a reduction in viscosity with increasing temperature, but for semi-crystalline polymers there is a very dramatic reduction in viscosity which occurs at a specific melting temperature or over a much narrower temperature range compared to amorphous polymers.

To improve 3-dimensional printing using amorphous polymer powders, the present disclosure provides coalescent fluids that include viscosity reducing agents. The viscosity reducing agents can be a compound(s) that lower the viscosity of the amorphous polymer powder when the coalescent fluid is applied to the powder. In some cases, the viscosity reducing agents can partially solvate the amorphous polymer. Polymer powder that has been treated with a viscosity reducing agent can still undergo a further reduction in viscosity with increasing temperature. When the viscosity reducing agent is printed onto only a portion of the amorphous polymer powder, the printed portion can have a lower viscosity compared to the unprinted portions at any given temperature. Therefore, the viscosity reducing agent can allow the printed portion to fuse at a lower fusing temperature while the surrounding polymer particles do not fuse. In further examples, the viscosity reducing agent can be combined with a thermal fusing agent to absorb energy from an electromagnetic radiation source, such as a fusing lamp. The thermal fusing agent can cause the printed portion heat up to a higher temperature than the surrounding powder, while at the same time the viscosity reducing agent can lower the fusing temperature of the printed powder. This can greatly improve selectivity between the fused portion and unfused portion of the powder bed when forming 3-dimensional printed parts from amorphous polymer powder.

The coalescence of two spherical polymer particles can be modeled using Equation 1:

$$\frac{x^2}{a*t} = 1.5*\gamma/\eta \quad (1)$$

In Equation 1, x is the radius of the neck forming between the coalescing spherical particles, a is the initial radius of the spherical particles, t is time, y is the surface tension of the polymer, and q is the viscosity of the polymer. According to this model, surface tension is the driving force of coalescence and viscosity is the restraining force against coalescence. Other models of coalescence exist, which further elaborate on this basic model.

Figure 1B:
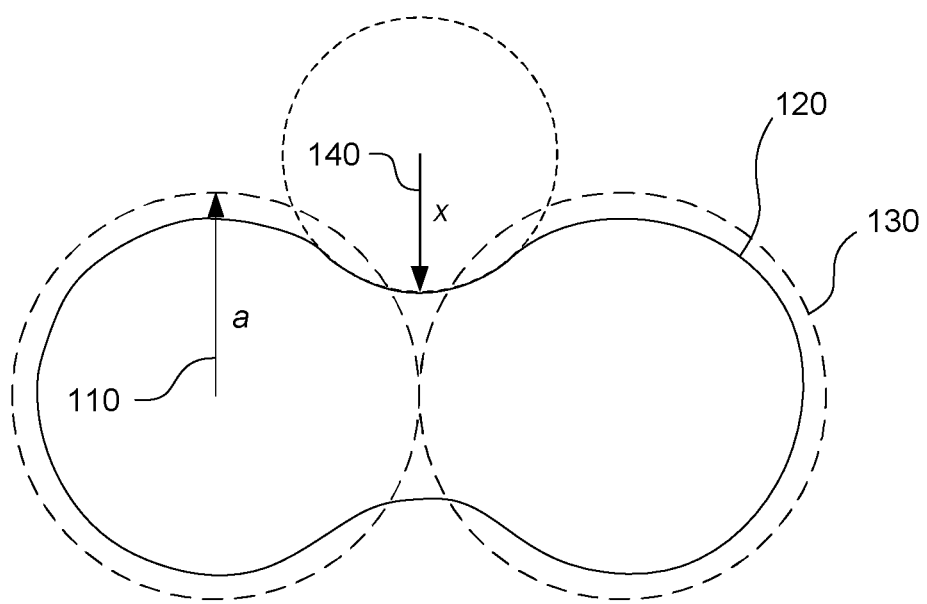

FIGS. 1A and 1B are schematic cross-sectional views of two coalescing particles to illustrate the model of Equation 1. Two spherical particles 100 have an initial radius a 110 before coalescing. The particles then coalesce to form a coalesced body 120 as shown in FIG. 1B, The original surface 130 of the particles is shown as a dashed line. The neck radius x 140 is shown in a dashed circle representing the curvature of the neck between the particles.

As explained above, applying a viscosity reducing agent to the polymer powder can reduce the viscosity of the polymer, allowing the particles to coalesce at lower temperatures, Although the model shown in FIGS. 1A and 1B includes only two particles, in practice a powder bed of many particles can be used. When the particles are fused, each particle can coalesce with neighboring particles to form a network of fused particles. This network of fused particles makes up the final 3-dimensional printed part.

With this description in mind, one example of the presently disclosed technology can include a material set including an amorphous polymer powder and a coalescent fluid. The amorphous polymer powder can include polymer particles having an average particle size from 1 micron to 300 microns. The coalescent fluid can include a viscosity reducing agent that lowers the viscosity of the amorphous polymer powder when applied to the powder.

As used herein, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles.

In certain examples, the amorphous polymer powder particles can have a variety of shapes, such as substantially spherical particles or irregularly-shaped particles. In some examples, the polymer powder can be capable of being formed into 3D printed parts with a resolution of 10 to 300 microns. As used herein, "resolution" refers to the size of the smallest feature that can be formed on a 3D printed part. The polymer powder can form layers from about 10 to about 300 microns thick, allowing the fused layers of the printed part to have roughly the same thickness. This can provide a resolution in the z-axis direction of about 10 to about 300 microns. The polymer powder can also have a sufficiently small particle size and sufficiently regular particle shape to provide about 10 to about 300 micron resolution along the x-axis and y-axis. As used herein, "z-axis" refers to the axis extending perpendicular to the plane of the polymer bed layers, and the "x-axis" and "y-axis" refer to axes that extend horizontally in the plane of the polymer bed layers.

In some examples, the amorphous polymer powder can be colorless. For example, the polymer powder can have a white, translucent, or transparent appearance. When used with a colorless coalescent fluid, such polymer powders can provide a printed part that is white, translucent, or transparent. In other examples, the polymer powder can be colored for producing colored parts. In still other examples, when the polymer powder is white, translucent, or transparent, color can be imparted to the part by the coalescent fluid or another colored ink.

The amorphous polymer powder can have a fusing temperature from about 70° C. to about 400° C., In further examples, the polymer can have a fusing temperature from about 120° C. to about 200° C., As explained above, amorphous polymers do not have a specific melting point, but instead experience a gradual reduction in viscosity with increasing temperature. As used herein, the "fusing temperature" refers to the lowest temperature at which neighboring polymer particles coalesce to form a solid structure.

A variety of amorphous polymers can be used. For example, the amorphous polymer powder can include polycarbonate, polystyrene, acrylonitrile butadiene styrene, thermoplastic polyurethane, amorphous polyamide, polyimide, polyamide-imide, polyetherimide, polysulphone, polymethylmethacrylate, polyvinyl chloride, polyarylate, polyethersulfone, polyphenylsulfone, poly(p-phenylene), styrene-acrylonitrile resin, copolymers of polycarbonate with acrylonitrile butadiene styrene, copolymers of polycarbonate with polyethylene terephthalate, or combinations thereof.

The amorphous polymer particles can also in some cases be blended with a filler. The filler can include inorganic particles such as alumina, silica, or combinations thereof. When the amorphous polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of amorphous polymer particles to filler particles can be from 10:1 to 1:2 or from 5:1 to 1:1.

The coalescent fluid can include a viscosity reducing agent that is effective to reduce the viscosity of the amorphous polymer powder, thereby reducing the fusing temperature of the amorphous polymer powder. As used herein, "coalescent fluid" is used to describe generally a fluid that is dispensed onto portions of the powder bed to promote fusing of the amorphous polymer powder. Additionally, "thermal coalescent fluid" refers to a specific type of coalescent fluid that can contain a thermal fusing agent. Such thermal coalescent fluids can be formulated with or without a viscosity reducing agent. In some examples, the viscosity reducing agent can be miscible with and partially solvate the amorphous polymer powder. Various viscosity reducing agents can be more or less effective when used with particular amorphous polymers. Thus, in some examples the viscosity reducing agent and the amorphous polymer powder can be matched so that the viscosity reducing agent effectively reduces the viscosity of the polymer powder.

In certain examples, the viscosity reducing agent can be a plasticizer, Plasticizers can sometimes be added to a polymer to reduce the glass transition temperature of the polymer, lower the rigidity of the polymer, increase ductility of the polymer, increase the toughness of the polymer, and so on. These effects may not be the same as the viscosity reducing effect utilized in the present technology. However, plasticizers often also provide a reduction in viscosity of polymers in addition to their plasticizing effects. Adding plasticizers to the polymer powder can result in changes in the final properties of the 3-dimensional printed part. For example, the plasticizer can increase the ductility of the final printed part. In some cases, this change in properties of the final printed part can be desirable, especially because forming parts from polymer powder can often result in parts with low ductility. However, if plasticizing effects are not desired in the final printed part, the amount of plasticizer used as a viscosity reducing agent can be minimized to reduce the plasticizing effects. A low loading of plasticizer can be applied to the powder bed so that the plasticizer comes in contact with the surfaces of the polymer particles. Thus, the surfaces of the particles can be more affected by the plasticizer than the interior of the particles, which can substantially retain the original properties of the polymer. Because coalescence begins at the surfaces of the particles, using a low loading of plasticizer to reduce the viscosity of the polymer at the surfaces can be sufficient to promote coalescence of the particles.

Specific viscosity reducing agents can be effective for use with certain types of amorphous polymers. In some examples, the amorphous polymer can include polycarbonate, polystyrene, acrylonitrile butadiene styrene, or combinations thereof. Viscosity reducing agents suitable for use with these polymers can include dioctyl phthalate, methyl 4-hydroxybenzoate, bisphenol-A, dimethyl sulfoxide, N-methyl pyrrolidone, 2-pyrrolidone, tri-(2-ethylhexyl) phosphate, dicyclohexyl phthalate, dibutyl phthalate, mineral oil, other long-chain hydrocarbon oils, resorcinol bis (diphenyl phosphate), oligomeric phosphates, long chain fatty acid esters, N-2-hydroxyethyl-2-pyrrolidone, urea, ethylene carbonate, propylene carbonate, lactones, diethylene glycol, triethylene glycol, tetraethylene glycol, decalin, gamma-butyrolactone, dimethylformamide, phenylmethanol, tetraethylene glycol dimethyl ether, tri-(2-ethylhexyl) phosphate, dicyclohexyl phthalate, dibutyl phthalate, tritolyl phosphate, pentaerythritol tetraborate, trimellitic acid tridecyloctyl ester, and others.

The coalescent fluid can include the viscosity reducing agent in an amount from 2 wt % to 100 wt % with respect to the total weight of the coalescent fluid. In further examples, the viscosity reducing agent can be present in the coalescent fluid in an amount from 5 wt % to 100 wt %, from 5 wt % to 95 wt %, from 10 wt % to 50 wt %, from 15 wt % to 40%, or from 20 wt % to 30 wt %. In still further examples, the viscosity reducing agent can be present in the coalescent fluid in an amount greater than 5 wt %, greater than 15 wt %, greater than 20 wt %, or greater than 25 wt %. In one example, the coalescent fluid can consist essentially of the viscosity reducing agent. In some cases, the coalescent fluid can be formulated for printing onto the powder bed using a thermal fluid jet pen, such as a thermal inkjet pen. In additional examples, the coalescent fluid can be formulated for printing using other printing technologies such as piezo ink jet printing or continuous ink jet printing. Some viscosity reducing agents can have the appropriate properties, such as viscosity and boiling point, to be printed using these technologies. Therefore, some viscosity reducing agents can be printed without any additional liquid vehicle or other ingredients. In further examples, the coalescent fluid can include water, a liquid vehicle, and/or other ingredients suitable for use in a thermal fluid jet pen or in another printing system. Liquid vehicles and additional ingredients of the coalescent fluid and other fluids and inks of the material sets are described in more detail below.

In some examples the viscosity reducing agent can enable fusing of the amorphous polymer powder at a temperature at least 10° C. below the normal fusing temperature of the amorphous polymer powder when the coalescent fluid is printed on the amorphous polymer powder. In further examples, the viscosity reducing agent can enable fusing of the amorphous polymer powder at a temperature at least 15° C. or at least 20° C. below the normal fusing temperature of the amorphous polymer powder. The viscosity reducing agent can thus modify the effective fusing temperature of the amorphous polymer powder so that the powder can be fused at a lower temperature than the surrounding powder that has not been printed with the coalescent fluid.

In addition to the coalescent fluid containing the viscosity reducing agent, certain examples of material sets according to the present technology can also include a thermal coalescent fluid. The thermal coalescent fluid can include a thermal fusing agent capable of absorbing electromagnetic radiation to produce heat. The thermal coalescent fluid can be printed on a portion of the amorphous polymer powder bed and the bed can then be irradiated by a light source to selectively raise the temperature of the printed portion. The thermal coalescent fluid and the coalescent fluid including the viscosity reducing agent can be used in conjunction to increase the selectivity between the printed portion of the powder bed that is to be fused and the unprinted portions that remain unfused.

In another example, a viscosity reducing agent and a thermal fusing agent can both be included in a single coalescent fluid. The coalescent fluid can be printed on a portion of the powder bed as described above, and the coalescent fluid can provide the advantages of both the thermal fusing agent which raises the temperature of the printed portion when irradiated by a light source, and the viscosity reducing agent which lowers the fusing temperature of the printed portion. In a particular example, a coalescent fluid can include a thermal fusing agent capable of absorbing electromagnetic radiation to produce heat, and from 5 wt % to 95 wt % of a viscosity reducing agent. The viscosity reducing agent can be dioctyl phthalate, methyl 4-hydroxybenzoate, bisphenol-A, dimethyl sulfoxide, N-methyl pyrrolidone, 2-pyrrolidone, tri-(2-ethylhexyl) phosphate, dicyclohexyl phthalate, dibutyl phthalate, mineral oil, or combination thereof.

The thermal fusing agent can be colored or colorless. In various examples, the thermal fusing agent can be carbon black, near-infrared absorbing dyes, near-infrared absorbing pigments, tungsten bronzes, molybdenum bronzes, metal nanoparticles, or combinations thereof. Examples of near-infrared absorbing dyes include aminium dyes, tetraaryldiamine dyes, cyanine dyes, pthalocyanine dyes, dithiolene dyes, and others. In further examples, the thermal fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the thermal fusing agent can have a peak absorption wavelength in the range of 800 nm to 1400 nm.

The amount of thermal fusing agent in the thermal coalescent fluid can vary depending on the type of thermal fusing agent. In some examples, the concentration of thermal fusing agent in the thermal coalescent fluid can be from 0.1 wt % to 20 wt %. In one example, the concentration of thermal fusing agent in the thermal coalescent fluid can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

In some examples, the thermal coalescent fluid can have a black or gray color due to the use of carbon black as the fusing agent. However, in other examples the thermal coalescent fluid can be colorless or nearly colorless. The concentration of the thermal fusing agent can be adjusted to provide a thermal coalescent fluid in which the visible color of the fluid is not substantially altered by the thermal fusing agent. Although some of the above described fusing agents have low absorbance in the visible light range, the absorbance is usually greater than zero. Therefore, the thermal fusing agents can typically absorb some visible light, but their color in the visible spectrum can be minimal enough that it does not substantially impact the fluid's ability to take on another color when a colorant is added (unlike carbon black which can dominate the fluid's color with gray or black tones). The thermal fusing agents in concentrated form can have a visible color, but the concentration of the thermal fusing agents in the thermal coalescent fluid can be adjusted so that the thermal fusing agents may not be present in such high amounts that they alter the visible color of the fluid. For example, a thermal fusing agent with a very low absorbance of visible light wavelengths can be included in greater concentrations compared to a thermal fusing agent with a relatively higher absorbance of visible light. These concentrations can be adjusted based on a specific application with some experimentation.

In further examples, the concentration of the thermal fusing agent can be high enough that the fusing agent impacts the color of the thermal coalescent fluid, but low enough that when the fluid is printed on the thermoplastic polymer powder, the fusing agent does not impact the color of the powder. The concentration of the fusing agent can be balanced with the amount of thermal coalescent fluid that is to be printed on the polymer powder so that the total amount of fusing agent that is printed onto the polymer powder is low enough that the visible color of the polymer powder is not impacted. In one example, the fusing agent can have a concentration in the thermal coalescent fluid such that after the thermal coalescent fluid is printed onto the polymer powder, the amount of fusing agent in the polymer powder is from 0.0003 wt % to 5 wt % with respect to the weight of the polymer powder.

The thermal fusing agent can have a temperature boosting capacity sufficient to increase the temperature of the polymer powder above the fusing temperature of the polymer powder. As used herein, "temperature boosting capacity" refers to the ability of the thermal fusing agent to convert near-infrared light energy into thermal energy to increase the temperature of the printed polymer powder over and above the temperature of the unprinted portion of the polymer powder. Typically, the polymer powder particles can be fused together when the temperature increases to the fusing temperature of the polymer, or the temperature at which the polymer particles begin to flow together at the surfaces of the polymer particles.

In one example, the thermal fusing agent can have a temperature boosting capacity from about 10° C. to about 150° C. for a polymer with a fusing temperature from about 100° C. to about 350° C. If the powder bed is at a temperature within about 10° C. to about 150° C. of the fusing temperature, then such a thermal fusing agent can boost the temperature of the printed powder up to the fusing temperature, while the unprinted powder remains at a lower temperature. When a viscosity reducing agent is printed in conjunction with the thermal fusing agent, the effective fusing temperature of the printed portion can be reduced. Thus, the printed portion can be more fully coalesced while the unprinted portion remains unfused. In some examples, the powder bed can be preheated to a temperature from about 10° C. to about 150° C. lower than the fusing temperature of the polymer. The thermal coalescent fluid can then be printed onto the powder and the powder bed can be irradiated with a near-infrared light to coalesce the printed portion of the powder.

In further examples, the material sets according to the present technology can also include a detailing fluid. The detailing fluid can include a detailing agent capable of cooling the amorphous polymer powder in portions of the powder bed onto which the detailing fluid is printed. In some examples, the detailing fluid can be printed around the edges of the portion of the powder that is printed with the coalescent fluid and/or thermal coalescent fluid. The detailing fluid can improve selectivity between the fused and unfused portions of the powder bed by reducing the temperature of the powder around the edges of the portion to be fused.

In some examples, the detailing agent can be a solvent that evaporates at the temperature of the powder bed. As mentioned above, in some cases the powder bed can be preheated to a preheat temperature within 10° C. to 70° C. of the fusing temperature of the amorphous polymer powder. Depending on the type of amorphous polymer powder used, the preheat temperature can be in range of 90° C. to 200° C. or more. Thus, the detailing agent can be a solvent that evaporates when it comes into contact with the powder bed at the preheat temperature, thereby cooling the printed portion of the powder bed through evaporative cooling. In certain examples, the detailing agent can include water, co-solvents, or combinations thereof. In further examples, the detailing agent can be substantially devoid of thermal fusing agents. That is, in some examples, the detailing agent can be substantially devoid of ingredients that absorb enough energy from the light source to cause the powder to fuse. In certain examples, the detailing fluid can include colorants such as dyes or pigments, but in small enough amounts that the colorants do not cause the powder printed with the detailing fluid to fuse when exposed to the light source.

In further examples, the material sets can also include colored inks for adding color to the amorphous polymer powder. This can allow for printing of full-color 3-dimensional parts. In one example, the inks can include cyan, magenta, yellow, and black inks in addition to the coalescent fluid, thermal coalescent fluid, and detailing fluid if present.

Each of the coalescent fluid, thermal coalescent fluid, detailing fluid, and additional colored inks can be formulated for use in a fluid jet printer such as an ink jet printer. The viscosity reducing agents and thermal fusing agents can be stable in a fluid jet liquid vehicle and the inks can provide good jetting performance. In some examples, the viscosity reducing agent and thermal fusing agents can be water-soluble, water-dispersible, organic-soluble, or organic-dispersible. The viscosity reducing agent and thermal fusing agents can also be compatible with the amorphous polymer powder so that jetting the coalescent fluids onto the amorphous polymer powder provides adequate coverage and interfiltration of the viscosity reducing agent and thermal fusing agents into the powder.

Any of the above described fluids can also include a pigment or dye colorant that imparts a visible color to the fluids. In some examples, the colorant can be present in an amount from 0.1 wt % to 10 wt % in the fluids. In one example, the colorant can be present in an amount from 1 wt % to 5 wt %. In another example, the colorant can be present in an amount from 5 wt % to 10 wt %. However, the colorant is optional and in some examples the fluids can include no additional colorant. These fluids can be used to print 3D parts that retain the natural color of the polymer powder. Additionally, the fluids can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52, Examples of water-insoluble dyes include azo, xanthene, methine, polymethine, and anthraquinone dyes. Specific examples of water-insoluble dyes include ORASOL® Blue GN, ORASOL® Pink, and ORASOL® Yellow dyes available from Ciba-Geigy Corp, Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: PALIOGEN®) Orange, HELIOGEN® Blue L 6901F, HELIOGEN®) Blue NBD 7010, HELIOGEN® Blue K 7090, HELIOGEN® Blue L 7101F, PALIOGEN®) Blue L 6470, HELIOGEN®) Green K 8683, and HELIOGEN® Green L 9140. The following black pigments are available from Cabot: MONARCH® 1400, MONARCH® 1300, MONARCH®) 1100, MONARCH® 1000, MONARCH®) 900, MONARCH® 880, MONARCH® 800, and MONARCH®) 700. The following pigments are available from CIBA: CHROMOPHTAL®) Yellow 3G, CHROMOPHTAL®) Yellow GR, CHROMOPHTAL®) Yellow 8G, IGRAZIN®) Yellow SGT, IGRALITE® Rubine 4BL, MONASTRAL® Magenta, MONASTRAL® Scarlet, MONASTRAL® Violet R, MONASTRAL® Red B, and MONASTRAL® Violet Maroon B. The following pigments are available from Degussa: PRINTER® U, PRINTEX® V, PRINTEX® 140U, PRINTEX® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4, The following pigment is available from DuPont: TIPURE®) R-101. The following pigments are available from Heubach: DALAMAR® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow SGX-02, Hansa Yellow-X, NOVOPERM® Yellow HR, NOVOPERM® Yellow FGL, Hansa Brilliant Yellow 10GX, Permanent Yellow G3R-01, HOSTAPERM®, Yellow H4G, HOSTAPERM® Yellow H3G, HOSTAPERM®) Orange GR, HOSTAPERM® Scarlet GO, and Permanent Rubine F6B. The following pigments are available from Mobay: QUINDO® Magenta, INDOFAST® Brilliant Scarlet, QUINDO® Red R6700, QUINDO® Red R6713, and INDOFAST® Violet. The following pigments are available from Sun Chemical: L74-1357 Yellow, L75-1331 Yellow, and L75-2577 Yellow. The following pigments are available from Columbian: RAVEN® 7000, RAVEN® 5750, RAVEN® 5250, RAVEN® 5000, and RAVEN® 3500. The following pigment is available from Sun Chemical: LHD9303 Black. Any other pigment and/or dye can be used that is useful in modifying the color of the above described fluids, inks, and/or ultimately, the printed part.

The components of the above described fluids can be selected to give the fluids good jetting performance and the ability to color the polymer powder with good optical density. Besides the viscosity reducing agents, thermal fusing agents, colorants and other ingredients described above, the fluids can also include a liquid vehicle. In some examples, the liquid vehicle formulation can include water and one or more co-solvents present in total at from 1 wt % to 50 wt %, depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can also include dispersants in an amount from 5 wt % to 20 wt %. The balance of the formulation can be purified water, or other vehicle components such as biocides, viscosity modifiers, materials for pH adjustment, sequestering agents, preservatives, and the like. In one example, the liquid vehicle can be predominantly water. In some examples, a water-dispersible or water-soluble fusing agent can be used with an aqueous vehicle. Because the fusing agent is dispersible or soluble in water, an organic co-solvent is not necessary to solubilize the fusing agent, Therefore, in some examples the fluids can be substantially free of organic solvent. However, in other examples a co-solvent can be used to help disperse other dyes or pigments, or improve the jetting properties of the fluids. In still further examples, a non-aqueous vehicle can be used with an organic-soluble or organic-dispersible fusing agent.

In certain examples, a high boiling point co-solvent can be included in the fluids. The high boiling point co-solvent can be an organic co-solvent that boils at a temperature higher than the temperature of the powder bed during printing. In some examples, the high boiling point co-solvent can have a boiling point above 250° C., In still further examples, the high boiling point co-solvent can be present in the fluids at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

One or more surfactants can also be used, such as alkyl polyethylene oxides, alkyl phenyl polyethylene oxides, polyethylene oxide block copolymers, acetylenic polyethylene oxides, polyethylene oxide (dpesters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to; liponic esters such as TERGITOL™ 15-S-12 surfactant, TERGITOL™ 15-S-7 surfactant available from Dow Chemical Company, LEG-1 and LEG-7; TRITON™ X-100; TRITON™ X-405 available from Dow Chemical Company; and sodium dodecylsulfate.

Consistent with the formulation of this disclosure; various other additives can be employed to optimize the properties of the fluid compositions for specific applications, Examples of these additives include those added to inhibit the growth of harmful microorganisms. These additives may be biocides, fungicides; and other microbial agents. Examples of suitable microbial agents include, but are not limited to, NUOSEPT® biocide (Nudex, Inc.); UCARCIDE™ biocide (Union carbide Corp.), VANCIDE® biocide (R.T. Vanderbilt Co.), PROXEL® biocide (ICI America), and combinations thereof.

Sequestering agents; such as EDTA (ethylene diamine tetra acetic acid), may be included to eliminate the deleterious effects of heavy metal impurities, and buffer solutions may be used to control the pH of the fluids. From 0.01 wt % to 2 wt %, for example, can be used. Viscosity modifiers and buffers may also be present, as well as other additives to modify properties of the fluids as desired. Such additives can be present at from 0.01 wt % to 20 wt %.

In one example, the liquid vehicle can include the components and amounts as shown in Table 1:

TABLE 1

| Ingredients | Wt. (%) |
| --- | --- |
| 2-Pyrrolidinone | 50-75 |
| 2-Methyl-1,3-Propanediol | 5-12 |
| Tetraethylene glycol | 5-12 |
| LEG-1 | 5-10 |
| SURFYNOL ® CT151 surfactant from Air Products and Chemicals, Inc. | 0.2-1.2 |

TABLE 1-continued

| Ingredients | Wt. (%) |
| --- | --- |
| ZONYL ® FSO fluorosurfactant from DuPont | 0.01-1 |
| SMA1440H | 1-5 |
| Tris base | 0.1-1 |

In another example, the liquid vehicle can include the components and amounts as shown in Table 2:

TABLE 2

| Ingredients | Wt. (%) |
| --- | --- |
| 2-Pyrrolidinone | 50-99.9 |
| CRODAFOS N3 ™ surfactant from Croda | 0.1-5 |

In yet another example, the liquid vehicle can include the components and amounts as shown in Table 3:

TABLE 3

| Ingredients | Wt % |
| --- | --- |
| 2-methyl-1,3-propanediol | 10-40 |
| CRODAFOS N3 ™ surfactant from Croda | 0.1-5 |
| TERGITOL ™ 15-S-12 surfactant from Dow Chemical Company | 0.1-3 |
| ZONYL ® FSO-100 fluorosurfactant from DuPont | 0.5-5 |
| PROXEL ™ GXL (20% as is) biocide from Lonza | 0.1-1 |

In still another example, the liquid vehicle can include the components and amounts as shown in Table 4:

TABLE 4

| Ingredients | Wt % |
| --- | --- |
| 2-Hydroxyethyl-2-Pyrrolidone | 5-20 |
| DANTOCOL ™ DHE bonding agent from Lonza | 30-80 |
| LEG | 1-20 |
| CRODAFOS N3 ™ surfactant from Croda | 1-20 |
| SURFYNOL ® SEF (75% as is) surfactant from Air Products and Chemicals, Inc. | 1-10 |
| KORDEK ™ MLX (10% as is) biocide from Dow Chemical Company | 0.1-5 |
| PROXEL ™ GXL (20% as is) biocide from Lonza | 0.1-5 |

In a further example, the liquid vehicle can include the components and amounts as shown in Table 5:

TABLE 5

| Ingredients | Wt % |
| --- | --- |
| Tripropylene glycol | 20-60 |
| 1-(2-Hydroxyethyl)-2-imidazolidinone | 20-40 |
| LEG-1 | 0.5-5 |
| CRODAFOS N3 ™ surfactant from Croda | 1-6 |
| TERGITOL ™ 15-S-7 surfactant from Dow Chemical Company | 1-6 |
| ZONYL ® FSO fluorosurfactant from DuPont | 0.1-1.2 |
| PROXEL ™ GXL biocide from Lonza | 0.1-1.2 |

It is noted the liquid vehicle formulations of Tables 1 to 5 are provided by example only and other formulations with similar properties can likewise be formulated in accordance with the present technology.

Figure 2:
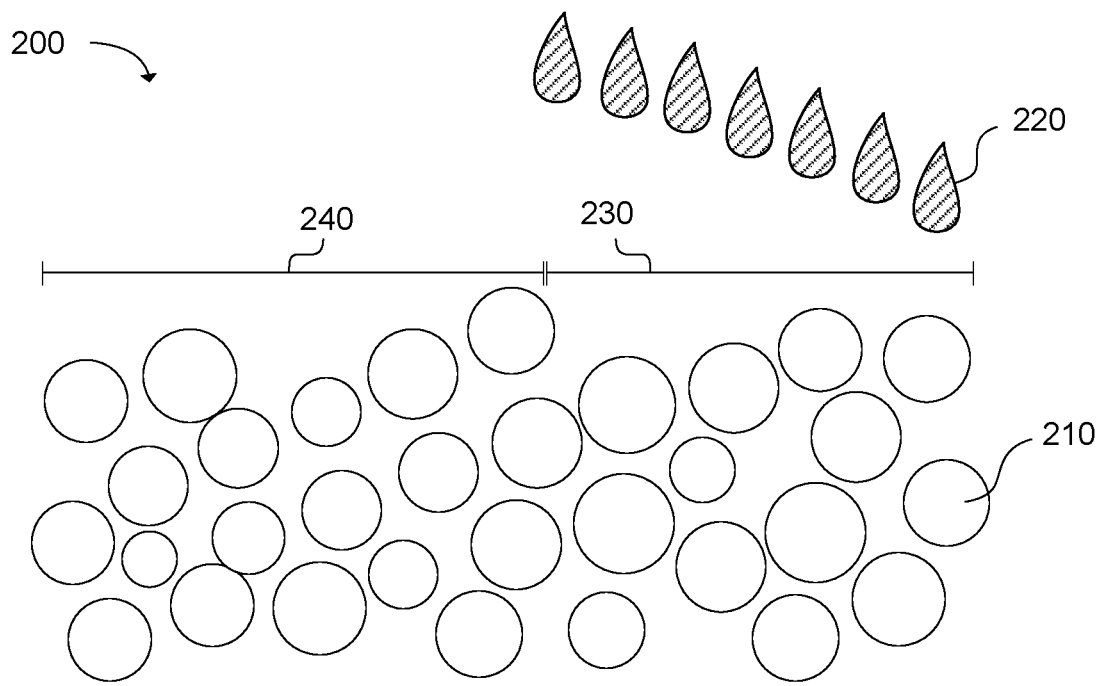
FIG. 2 is a close-up side cross-sectional view of a layer of amorphous polymer powder and a coalescent fluid in accordance with examples of the present disclosure.
Figure 3:
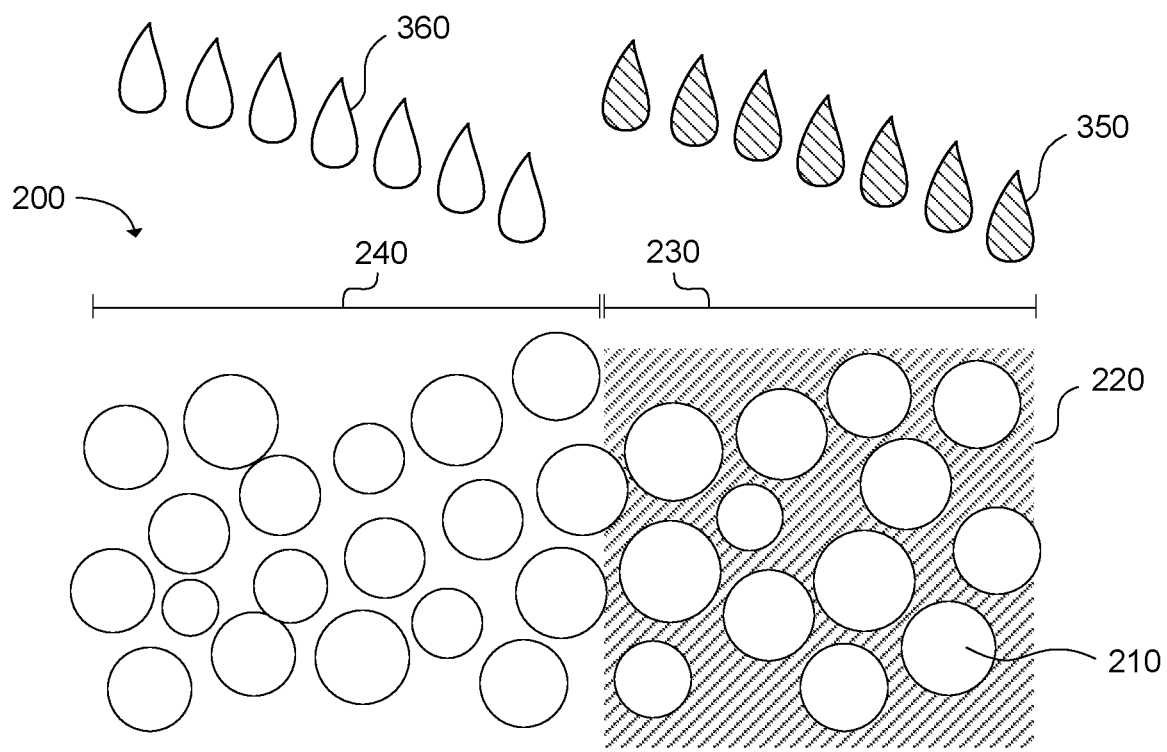
FIG. 3 is a close-up side cross-sectional view of a layer of amorphous polymer powder printed with a coalescent fluid, as well as a thermal coalescent fluid and a detailing fluid in accordance with examples of the present disclosure.
Figure 4:
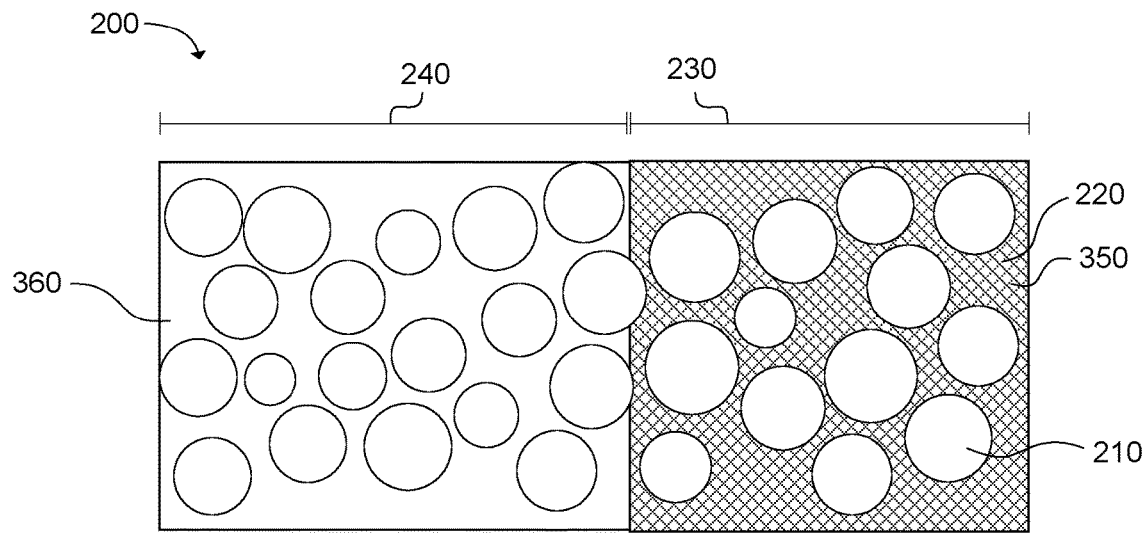
FIG. 4 is a close-up side cross-sectional view of a layer of amorphous polymer powder after being printed with a coalescent fluid, thermal coalescent fluid, and detailing fluid in accordance with examples of the present disclosure.

One example illustrating the use of a material set according to the present technology is shown in FIGS. 2-4. FIG. 2 shows a layer 200 of amorphous polymer powder particles 210. A coalescent fluid 220 including a viscosity reducing agent is dispensed onto a first portion 230 of the layer, A second portion 240 of the layer is not printed with the coalescent fluid.

FIG. 3 shows the layer 200 of amorphous polymer powder particles 210 after the coalescent fluid 220 has been printed onto the first portion 230 of the layer. A thermal coalescent fluid 350 is then printed onto the first portion of the layer, and a detailing fluid 360 is printed onto the second portion 240 of the layer. The thermal coalescent fluid can be printed over the coalescent fluid including the viscosity reducing agent. In other examples, the thermal coalescent fluid can be printed before the coalescent fluid including the viscosity reducing agent, or both the thermal fusing agent and the viscosity reducing agent can be included in a single coalescent fluid.

FIG. 4 shows the layer 200 of amorphous polymer powder particles 210 after the coalescent fluid 220 and thermal coalescent fluid 350 have been printed onto the first portion 230 and detailing fluid 360 has been printed onto the second portion 240.

Figure 5:
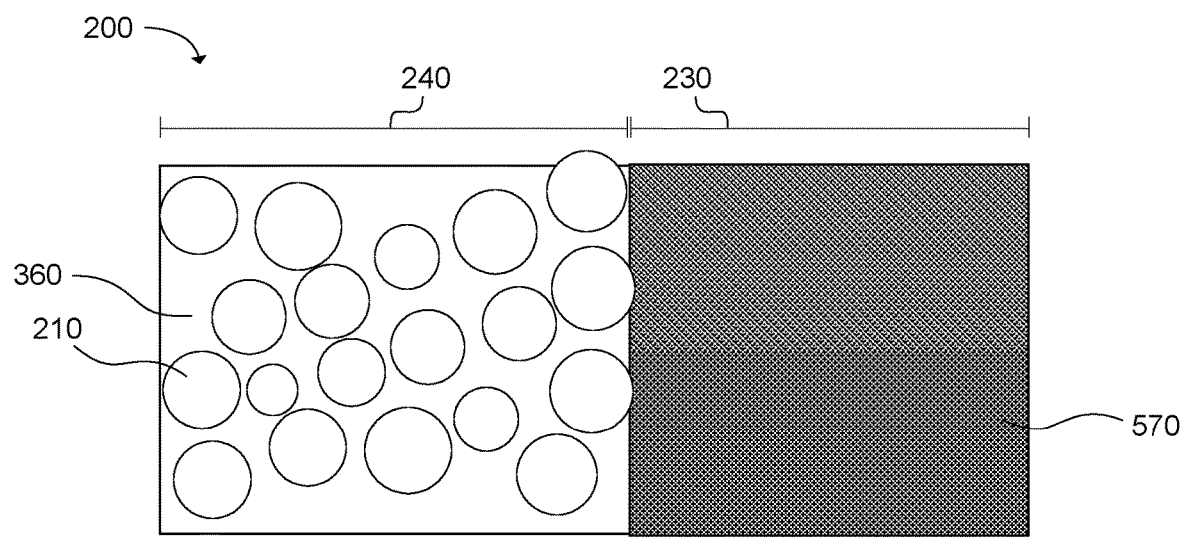
FIG. 5 is a close-up side cross-sectional view of a layer of amorphous polymer powder having a fused portion and an unfused portion in accordance with examples of the present disclosure.

FIG. 5 shows the layer 200 of amorphous polymer powder particles 210 after being cured by exposure to a light source. The polymer powder particles in the first portion 230 have fused together to form a matrix 570 of fused polymer particles. The polymer particles in the second portion 240 which were printed with the detailing fluid 360 remain as separate particles.

Figure 6:
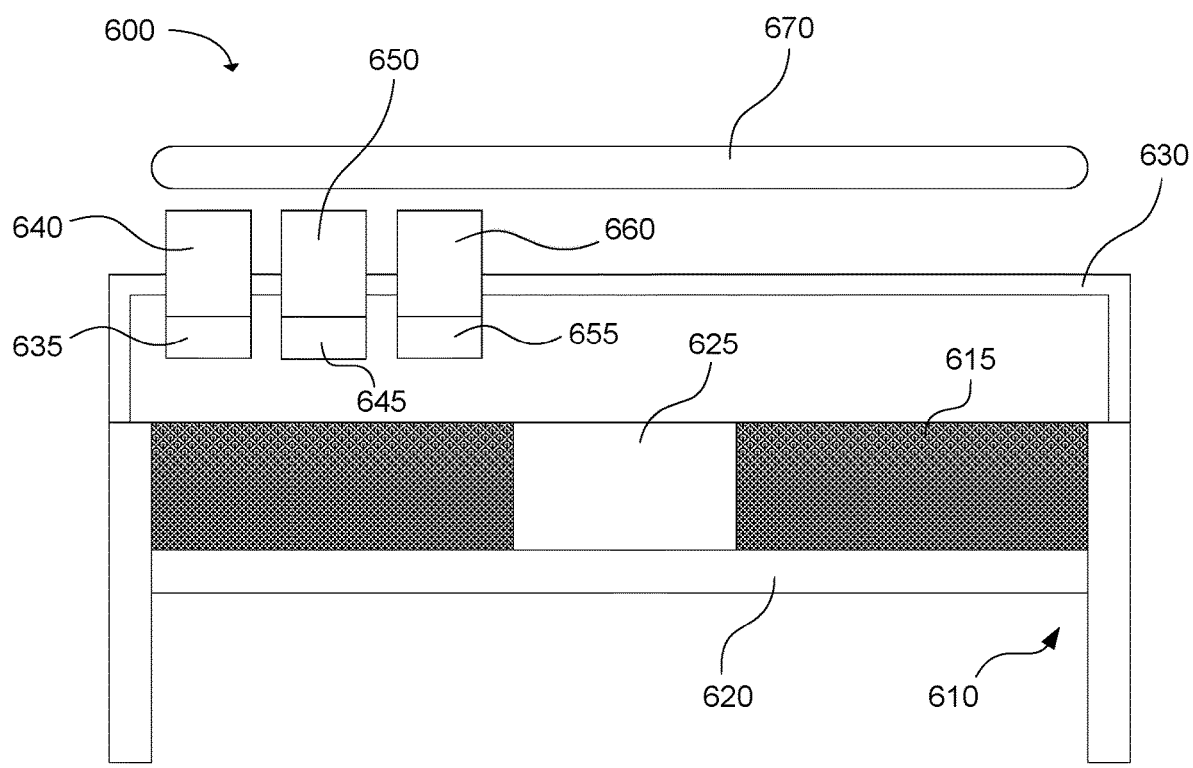
FIG. 6 is a schematic view of a 3-dimensional printing system in accordance with examples of the present disclosure.

In addition to the fluids and material sets described above, the present technology also encompasses 3-dimensional printing systems that include the fluids and material sets. An example of a 3-dimensional printing system 600 is shown in FIG. 6. The system includes a powder bed 610 containing an amorphous polymer powder 615. In the example shown, the powder bed has a moveable floor 620 that allows the powder bed to be lowered after each layer of the 3-dimensional part 625 is printed. The system also includes a fluid jet printer 630 that includes a first fluid ejector 635 in communication with a reservoir of a coalescent fluid 640 including a viscosity reducing agent. The first fluid ejector can be configured to print the coalescent fluid onto the powder bed. A second fluid ejector 645 is in communication with a reservoir of a thermal coalescent fluid 650 including a thermal fusing agent. The second fluid ejector can be configured to print the thermal coalescent fluid onto the powder bed, A third fluid ejector 655 is in communication with a reservoir of a detailing fluid 660, The third fluid ejector can be configured to print the detailing fluid onto the powder bed. After the fluids have been printed onto the powder bed, an electromagnetic radiation fusing source such as fusing lamp 670 can be used to expose the powder bed to electromagnetic radiation sufficient to fuse the powder that has been printed with the coalescent fluid and the thermal coalescent fluid.

The fluids and material sets used in the 3-dimensional printing system can include any of the components and ingredients described above. In a particular example, the viscosity reducing agent in the coalescent fluid can be dioctyl phthalate, methyl 4-hydroxybenzoate, bisphenol-A, dimethyl sulfoxide, N-methyl pyrrolidone, 2-pyrrolidone, tri-(2-ethylhexyl) phosphate, dicyclohexyl phthalate, dibutyl phthalate, mineral oil, or combinations thereof. In another example, the viscosity reducing agent can make up 5 wt % to 100 wt % of the coalescent fluid. In yet another example, the viscosity reducing agent can enable fusing of the amorphous polymer powder at a temperature at least 10° C. below the fusing temperature of the amorphous polymer powder when the coalescent fluid is printed on the amorphous polymer powder.

To achieve good selectivity between the fused and unfused portions of the powder bed, the viscosity reducing agent can reduce the effective fusing temperature of the printed portion of the powder bed while the thermal fusing agent can absorb enough energy to boost the temperature of the printed portion above this effective fusing temperature. Thus, the portions of the powder bed printed with the viscosity reducing agent and the thermal fusing agent can be fused by the electromagnetic radiation fusing source or fusing lamp without fusing the surrounding portions of the powder bed. The detailing fluid can be printed around the edges of the portion to be fused, cooling the powder around the edges and further increasing the temperature difference between the portion to be fused and the surround portions of the powder bed. In some examples, the 3-dimensional printing system can include preheaters for preheating the amorphous polymer powder to a temperature near the fusing temperature, or near the effective fusing temperature of the polymer powder after being printed with the viscosity reducing agent. In one example, the system can include a print bed heater to heat the print bed during printing. The preheat temperature used can depend on the type of amorphous polymer used. In some examples, the print bed heater can heat the print bed to a temperature from 50° C. to 250° C. The system can also include a supply bed, where polymer particles can be stored before being spread in a layer onto the print bed. The supply bed can have a supply bed heater. In some examples, the supply bed heater can heat the supply bed to a temperature from 80° C. to 140° C.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the portions printed with the viscosity reducing agent and the thermal fusing agent while leaving the unprinted portions of the polymer powder below the fusing temperature.

In one example, the electromagnetic radiation fusing source or fusing lamp can be matched with the thermal fusing agents so that the source emits wavelengths of light that match the peak absorption wavelengths of the thermal fusing agents. A thermal fusing agent with a narrow peak at a particular near-infrared wavelength can be used with a electromagnetic radiation fusing source that emits a narrow range of wavelengths at approximately the peak wavelength of the fusing agent. Similarly, a fusing agent that absorbs a broad range of near-infrared wavelengths can be used with a electromagnetic radiation fusing source that emits a broad range of wavelengths. Matching the fusing agent and the electromagnetic radiation fusing source in this way can increase the efficiency of coalescing the polymer particles with the fusing agent printed thereon, while the unprinted polymer particles do not absorb as much light and remain at a lower temperature.

Depending on the amount of thermal fusing agent present in the polymer powder, the absorbance of the thermal fusing agent, the preheat temperature, and the fusing temperature of the polymer, an appropriate amount of irradiation can be supplied from the electromagnetic radiation fusing source or fusing lamp. In some examples, the fusing lamp can irradiate each layer from about 0.1 to about 10 seconds per pass. In further examples, the fusing lamp can move across the powder bed at a rate of 1 inch per second to 60 inches per second to cure each layer. In still further examples, the fusing lamp can move across the powder bed at a rate of 5 inches per second to 20 inches per second.

It is noted that, as used in this specification and the appended claims, the singular forms "a," "an," and "the" include plural referents unless the context clearly dictates otherwise.

As used herein, "liquid vehicle" refers to a liquid fluid in which additives may be placed to form jettable fluids, such as coalescent fluids, detailing fluids, or inks. A wide variety of liquid vehicles may be used in accordance with the technology of the present disclosure. Such liquid vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and fusing agents, the liquid vehicle can carry solid additives such as polymers, latexes, UV curable materials, plasticizers, salts, etc.

As used herein, "colorant" can include dyes and/or pigments.

As used herein, "dye" refers to compounds or molecules that absorb electromagnetic radiation or certain wavelengths thereof. Dyes can impart a visible color to a fluid if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 5 wt %.

As used herein, "fluid jetting" or "jetting" refers to compositions that can be ejected from jetting architecture, such as ink-jet architecture. Ink-jet architecture can include thermal, piezo, or continuous inkjet architecture, Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

A number of coalescent fluids were prepared including viscosity reducing agents. The formulations of four of the coalescent fluids are given in Table 6:

TABLE 6

| Fluid ID | Formulation |
|---|---|
| VR1 | 7 wt % methyl 4-hydroxybenzoate, 46 wt % vehicle A; 46 wt % water |
| VR2 | 40 wt % 2-pyrrolidone, 20 wt % vehicle B; 40 wt % water |
| VR3 | 40 wt % dimethyl sulfoxide, 20 wt % vehicle B; 40 wt % water |
| VR4 | 5 wt % dioctyl phthalate; 1 wt % Joncryl-683, 20 wt % vehicle A; 74 wt % water |

The formulation of vehicle A is given in Table 7:

TABLE 7

| Ingredient | Concentration (wt %) |
|---|---|
| 2-Pyrrolidinone | 10 |
| 1,6-Hexanediol | 18 |
| 1-(2-Hydoxyethyl)-2-Pyrrolidone | 18 |
| SURFYNOL ® CT 211 (available from Air Products) | 0.32 |
| POLYFOX ™ PF-154N (available from OMNOVA Solutions) | 1.6 |
| DOWFAX ™ 2A1 (available from Dow) | 0.64 |
| CRODAFOS ™ N3 Acid (available from Croda) | 0.76 |

TABLE 7-continued

| Ingredient | Concentration (wt %) |
|---|---|
| EDTA-Na | 0.2 |
| 3-(N-morpholino)propanesulfonic acid buffer | 0.36 |
| PROXEL ™ GXL (available from Arch Chemicals Inc.) | 0.2 |
| Water | balance |

The formulation of vehicle B is given in Table 8:

TABLE 8

| Ingredient | Concentration (wt %) |
|---|---|
| 2-Pyrrolidinone | 40 |
| CRODAFOS ™ O3A (available from Croda) | 1 |
| SURFYNOL ® SEF (available from Air Products) | 1.5 |
| CAPSTONE ® FS-35 (available from DuPont) | 0.1 |
| CARBOSPERSE ™ K 7028 (available from Lubrizol) | 0.02 |
| TRILON ® M (available from BASF) | 0.08 |
| PROXEL ™ GXL (available from Arch Chemicals Inc.) | 0.36 |
| KORDEK ™ MLX (available from Dow) | 0.28 |
| Water | balance |

Each of the coalescent fluids was tested for efficacy of the viscosity reducing agent by the following method. Thin films of polystyrene powder, polycarbonate powder, and acrylonitrile butadiene styrene powder were formed on glass slides. A 5 microliter drop of each fluid was spotted onto the top of each type of polymer powder. The glass slides were then transferred to hot plates at temperatures about 20° C. below the fusing temperature of each type of polymer. The hotplate temperature for acrylonitrile butadiene styrene was 120° C. The hotplate temperatures for polystyrene and polycarbonate were each 140° C. The materials were allowed to come to thermal equilibrium for 2 minutes and then the slides were removed from the hot plate. After allowing the powder to cool to room temperature, each spot where the coalescent fluids were applied was assessed for consolidation of the polymer particles. Each of the coalescent fluids VR1, VR2, VR3, and VR4 effectively consolidated the polymer powder, forming solid material that could be removed from the glass slide and manipulated.

Example 2

A 3-dimensional printing system was used to form printed parts from acrylonitrile butadiene styrene powder. The powder bed was preheated to a preheat temperature from 90° C. to 110° C. The maximum bed temperature during curing with the fusing lamp was 140° C. Coalescent fluid VR2 shown in Table 6 above was loaded into multiple fluid jet pens in the 3-dimensional printing system. The amount of the coalescent fluid printed onto each layer of the powder was such that the final printed part had about 30 wt % 2-pyrrolidone and about 70 wt % acrylonitrile butadiene styrene. A thermal coalescent fluid including a near-infrared absorbing dye was also used in conjunction with coalescent fluid VR2. Three sample parts were printed, one with the thermal coalescent fluid at a contone level of 64 yielding a final part with 0.2 wt % of the near-infrared absorbing dye in the part, one with the thermal coalescent fluid at a contone level of 16 yielding 0.06 wt % of the near infrared absorbing dye in the part, and one with the thermal coalescent fluid at a contone level of 4 yielding 0.015 wt % of the near infrared absorbing dye in the part. Moderate caking of the powder bed occurred, but all of the printed parts were easily sandblasted to produce good quality printed parts.

Example 3

A series of small rectangular parts were printed from acrylonitrile butadiene styrene powder using a 3-dimensional printing system. The parts were printed using various combinations and concentrations of viscosity reducing agents and thermal fusing agents. The agents used and results of printing are shown in Table 9:

TABLE 9

| Sample No. | VR Agent | Thermal Fusing Agent | Results |
|---|---|---|---|
| 1 | 22 wt % DMSO | — | Well fused part with good selectivity |
| 2 | 33 wt % DMSO | — | Well fused part with good selectivity |
| 3 | 44 wt % DMSO | — | Well fused part with good selectivity |
| 4 | 11 wt % 2-P | — | Well fused part with good selectivity |
| 5 | 22 wt % 2-P | — | Well fused part with good selectivity |
| 6 | 33 wt % 2-P | — | Well fused part with good selectivity |
| 7 | 44 wt % 2-P | — | Well fused part with good selectivity |
| 8 | 27 wt % DMSO | — | Fused part with moderate selectivity |
| 9 | 27 wt % DMSO | 0.2 wt % PEDOT:PSS | Well fused part with good selectivity |
| 10 | 27 wt % DMSO | 0.4 wt % PEDOT:PSS | Well fused part with good selectivity |
| 11 | 27 wt % DMSO | 0.8 wt % PEDOT:PSS | Well fused part with good selectivity |
| 12 | 27 wt % DMSO | 1.5 wt % PEDOT:PSS | Well fused part with good selectivity |
| 13 | 27 wt % 2-P | — | Fused part with moderate selectivity |
| 14 | 27 wt % 2-P | 0.2 wt % PEDOT:PSS | Fused part with moderate selectivity |
| 15 | 27 wt % 2-P | 0.4 wt % PEDOT:PSS | Well fused part with good selectivity |
| 16 | 27 wt % 2-P | 0.8 wt % PEDOT:PSS | Well fused part with good selectivity |
| 17 | 27 wt % 2-P | 1.5 wt % PEDOT:PSS | Well fused part with good selectivity |
| 18 | 8 wt % 2-P | 0.5 wt % of carbon black with longer fusing time | minimal thermal bleed |
| 19 | 8 wt % 2-P | 0.5 wt % of carbon black with shorter fusing time | minimal thermal bleed |
| 20 | 4 wt % 2-P | 0.5 wt % of carbon black | significant thermal bleed, too little VR agent |

In Table 9, "DMSO" refers to dimethyl sulfoxide, "2-P" refers to 2-pyrrolidone, and "PEDOT:PSS" refers to poly(3,4-ethylenedioxythiophene)-poly(styrenesulfonate).

Example 4

Polystyrene was tested with several VR agents. The VR agents tested included 5 wt % methyl 4-hydroxybenzoate, 5 wt % dioctyl phthalate, and 100 wt % dioctyl phthalate. Polystyrene powder was spread in a thin layer on a glass slide, and each VR agent was dropped onto the powder. The glass slide was placed onto a hot plate at a temperature of about 130° C., which is below the fusing temperature of polystyrene (about 160° C.), for 2 minutes. After cooling to room temperature, the untreated powder exhibited little consolidation whereas the portions which had been treated with the VR agents were fused together. The sample treated with 100 wt % dioctyl phthalate was completely consolidated. The same process was repeated, except that polystyrene was mixed with the VR agents first and then the mixtures were placed onto the hot plate for 2 minutes. The mixtures of polystyrene with the VR agents were once again fused together while the pure polystyrene powder was not. The mixture including the 100 wt % dioctyl phthalate VR agent was fully consolidated and was be easily lifted and manipulated.

What is claimed is:

1. A material set, comprising:
    an amorphous polymer powder having an average particle size from 1 micron to 300 microns;
    a thermal coalescent fluid comprising a thermal fusing agent capable of absorbing electromagnetic radiation to produce heat; and
    a coalescent fluid, separate from the amorphous polymer powder and the thermal coalescent fluid, comprising a viscosity reducing agent to reduce the viscosity of the amorphous polymer powder.

2. The material set of claim 1, further comprising a detailing fluid comprising a detailing agent capable of cooling amorphous polymer powder onto which the detailing fluid is printed.

3. The material set of claim 1, wherein the thermal fusing agent is carbon black, graphite, carbon nanotubes, a near-infrared absorbing dye, a near-infrared absorbing pigment, a tungsten bronze, a molybdenum bronze, metal nanoparticles, a conjugated polymer, or combinations thereof.

4. The material set of claim 1, wherein the viscosity reducing agent is a plasticizer.

5. The material set of claim 1, wherein the viscosity reducing agent is dioctyl phthalate, methyl 4-hydroxybenzoate, bisphenol-A, dimethyl sulfoxide, N-methyl pyrrolidone, 2-pyrrolidone, tri-(2-ethylhexyl) phosphate, dicyclohexyl phthalate, dibutyl phthalate, mineral oil, or combination thereof.

6. The material set of claim 1, wherein the viscosity reducing agent is present in an amount from 2 wt % to 100 wt %, with respect to the total weight of the coalescent fluid.

7. The material set of claim 1, wherein the viscosity reducing agent enables fusing of the amorphous polymer powder at a temperature at least 10° C. below a fusing temperature of the amorphous polymer powder when the coalescent fluid is printed on the amorphous polymer powder.

8. The material set of claim 1, wherein the viscosity reducing agent is dioctyl phthalate, methyl 4-hydroxybenzoate, dimethyl sulfoxide.

9. The material set of claim 1, wherein the viscosity reducing agent is dimethyl sulfoxide present in an amount from 22 wt % to 44 wt %, with respect to the total weight of the coalescent fluid.

10. A 3-dimensional printing system, comprising:
    a powder bed comprising an amorphous polymer powder;
    a fluid jet printer comprising a reservoir of a coalescent fluid comprising a viscosity reducing agent, said reservoir fluidly coupled to a fluid ejector to print the coalescent fluid onto the powder bed, wherein the fluid jet printer further comprises a reservoir of a thermal coalescent fluid comprising a thermal fusing agent capable of absorbing electromagnetic radiation to produce heat, said reservoir of thermal coalescent fluid fluidly coupled to a second fluid ejector to print the thermal coalescent fluid onto the powder bed; and
    an electromagnetic radiation fusing source to emit electromagnetic radiation sufficient to fuse amorphous polymer powder that has been printed with the coalescent fluid.

11. The system of claim 10, wherein the viscosity reducing agent is dioctyl phthalate, methyl 4-hydroxybenzoate, bisphenol-A, dimethyl sulfoxide, N-methyl pyrrolidone, 2-pyrrolidone, tri-(2-ethylhexyl) phosphate, dicyclohexyl phthalate, dibutyl phthalate, mineral oil, or combinations thereof.

12. The system of claim 10, wherein the viscosity reducing agent is present in an amount from 2 wt % to 100 wt %, with respect to the total weight of the coalescent fluid.

13. The system of claim 10, wherein the viscosity reducing agent enables fusing of the amorphous polymer powder at a temperature at least 10° C. below a fusing temperature of the amorphous polymer powder when the coalescent fluid is printed on the amorphous polymer powder.

14. A coalescent fluid, comprising:
    a thermal fusing agent capable of absorbing electromagnetic radiation to produce heat; and
    from 5 wt % to 95 wt %, with respect to the total weight of the coalescent fluid, of a viscosity reducing agent, wherein the viscosity reducing agent is dioctyl phthalate, methyl 4-hydroxybenzoate, bisphenol-A, dimethyl sulfoxide, N-methyl pyrrolidone, tri-(2-ethylhexyl) phosphate; dicyclohexyl phthalate, dibutyl phthalate, mineral oil, or combination thereof.

15. The coalescent fluid of claim 14, wherein the thermal fusing agent is carbon black, graphite, carbon nanotubes, a near-infrared absorbing dye, a near-infrared absorbing pigment, a tungsten bronze, a molybdenum bronze, metal nanoparticles, a conjugated polymer, or combinations thereof.

* * * * *